United States Patent [19]
Meijer

[11] 3,770,985
[45] Nov. 6, 1973

[54] VOLTAGE COMPARATOR STRUCTURE AND METHOD

[75] Inventor: Robert S. Meijer, Chicago, Ill.

[73] Assignee: Alnor Instrument Company, Div. Illinois Testing Laboratories, Inc., Chicago, Ill.

[22] Filed: Dec. 17, 1971

[21] Appl. No.: 209,191

[52] U.S. Cl. .............................. 307/235 R, 328/146
[51] Int. Cl. ............................................. H03k 5/20
[58] Field of Search ................................... 307/235; 328/146–149

[56] References Cited
UNITED STATES PATENTS
3,436,560   4/1969   Marchais ..................... 307/235 X
3,456,128   7/1969   Myers .......................... 307/235

Primary Examiner—John Zazworsky
Attorney—I. Irving Silverman et al.

[57] ABSTRACT

By applying to a current operated threshold device the sum of a constant current, a slowly increasing bias current, and alternately the currents derived from two voltages being compared, the larger of the two voltage derived currents will cross the threshold level first, and at a time prior to the sum of the constant current and bias current being equal to the threshold level. By detecting which derived current is being applied to the threshold device at the time the threshold level is crossed, the relative voltage magnitudes are ascertained, even when they are nearly equal. If a voltage sensitive threshold device is employed, its inputs would all be voltages rather than currents.

19 Claims, 3 Drawing Figures

PATENTED NOV 6 1973                                           3,770,985

VOLTAGE COMPARATOR STRUCTURE AND METHOD

BACKGROUND OF THE INVENTION

Voltage comparison methods and apparatus are quite common and take many forms. Contemporary technology frequently employs differential amplifier circuitry for voltage comparison. Such circuitry inherently possesses input voltage offset in the order of several millivolts. Moreover the magnitude of this offset changes with fluctuations of ambient temperature and the passage of time. Also, the magnitude of input voltage offset is not the same for each of a group of several differential amplifiers of the same type.

To compensate for the voltage offset problem, comparators of the better types are built with symmetry and provided with tracking networks. Yet, even with the additional cost of such comparators there remains some offset of an unknown and varying amount.

If voltage comparison is for purposes of measuring or comparing temperatures, thermotransducers operate in the millivolt range, in which one millivolt typically can represent 30° of temperature change. Hence, the voltage offset of a typical differential amplifier circuit in a voltage comparator is unacceptable for high precision comparison of two small imputted voltages.

SUMMARY OF THE INVENTION

In order to avoid the deficiencies and limitations of prior art voltage comparison methods and apparatus, the present invention employs a method and structure having the comparison accomplished by a simple threshold, a tunnel diode in the preferred embodiment of the structure. The voltages are applied alternately, rapidly, to a slowly increasing carrier level, until the thus modulated carrier crosses the threshold level, such crossing being caused by the modulation due to the larger of the two voltages. Coincidence detection is employed to identify which voltage was being applied at the time of crossing of the threshold.

DESCRIPTION OF THE PREFERRED EMBODIMENTS

Figure 1:
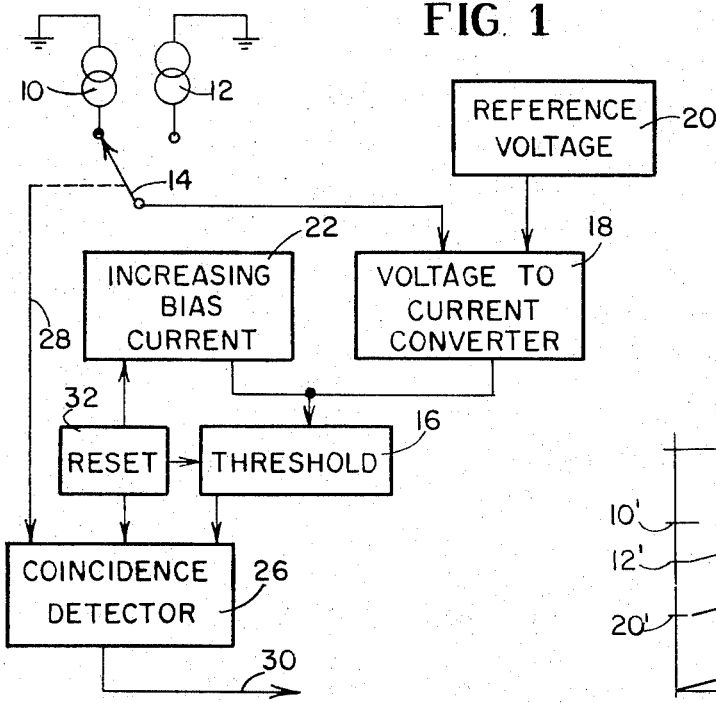
FIG. 1 is a block diagram representative of both the method and structure of the invention.

With reference to FIG. 1, a voltage 10 is to be compared to a voltage 12. For purposes of this description it is not necessary to identify the origin of the voltages 10 and 12, or to select one as being greater or less than the other, or to consider one to be fixed and the other to be varying, or even to consider one to be known and the other unknown. Although both voltages can be unknown, typically one of them such as the voltage 12, would be known and usually have a fixed value; hence, of one can ascertain the relative magnitude of the unknown voltage 10, the comparison can be accomplished. If, for example, the unknown voltage 10 is a representation of temperature in a furnace and it is desired to known when the furnace temperature comes up to and then exceeds or equals a desired temperature setting represented by the voltage 12, a precise measure of their relative magnitudes will accomplish this goal.

By a form of selecting, switching, commutating, or oscillating arrangement 14, the voltages 10 and 12 are alternately sampled for purpose of being applied to a threshold means 16. If the threshold means is voltage operated, then the voltages 10 and 12 would need no conversion; however, in the preferred form of this invention, the threshold means is current operated and, thus, a voltage to current converter 18 is interposed between the switch 14 and the threshold 16. Connected in the just mentioned manner, the voltage sources 10 and 12 will apply to the current operated threshold means 16 a train of current signals having rapidly alternating current peaks representing first the voltage 10 and then the voltage 12. The threshold at which the threshold means can be triggered is to be at a level well above that which might derived from the voltages 10 and 12; thus, their current signals alone can not trigger the threshold means.

Figure 2:
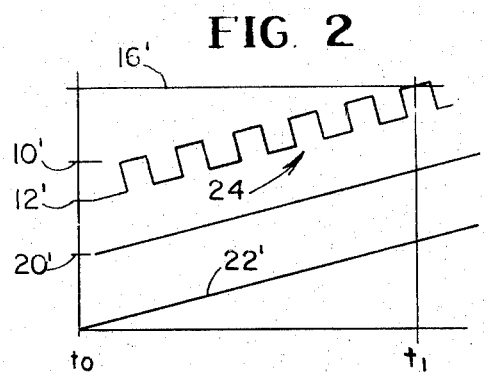
FIG. 2 is a waveform diagram illustrating the concept of the invention.

For purposes which will become clearer from a subsequent discussion of FIG. 2, a reference voltage 20 is coupled to the threshold means, also by way of the converter 18. It might be considered that the reference voltage provides a d.c. carrier current 20' upon which rides the current signals 10' and 12' (rapidly alternating) from the voltage sources 10 and 12. The sum of the carrier current and the alternating peaks are not to equal the trigger level 16' of the threshold means 16 and are designed to be significantly below the trigger level.

A source of slowly increasing bias current 22 has its output current 22' applied to the threshold means 16 in such a manner to bias slowly toward the threshold trigger level 16' the current signals 10' and 12' riding on the reference voltage 22', as shown in FIG. 2 with reference to a composite signal 24. As seen from FIG. 2, as the bias current increases from the time $t_0$ toward the time $t_1$, the composite signal sum of the bias current 22', the reference current 20; and either the current 12' or the current 10' slowly approaches the trigger level 16', until at the time $t_1$ the threshold level is crossed by that portion of the composite signal 24 which is attributable to the larger of the two signals, which in the present explanation is the signal 10' derived from the unknown voltage source 10.

It should be appreciated that, according to the concept of this invention, the larger of the two voltages always will cause the triggering of the threshold device. This situation will prevail, unless the slope of the bias current 22' is too great relative to the commutating rate of the switch 14. If the increase in the bias is too steep relative to the switching rate, then it is possible for a false discrimination to occur. If, however, the increase in the bias current during any one switching cycle is less than the difference between the magnitudes of the two derived currents 10' and 12', then the greater of the two first will cross the threshold 16'.

To identify which voltage source caused the threshold means 16 to be triggered, a coincidence detector 26 is coupled to the output of the threshold means and also to a switch position indicating output 28 from the switch 14. Accordingly, at the time $t_1$, when the threshold 16' is crossed, the coincidence detector 26 will provide an output on its output line 30 for indication of which of the sources 10 or 12 is the larger (crossed the threshold) at the time $t_1$.

A reset arrangement 32 is provided for resetting the coincidence detector 26, the source of bias current 22 and the threshold means 16 to their time $t_o$ condition subsequent to the time $t_1$, for thereby enabling a next comparison of any two voltages, such as those from the sources 10 and 12.

Figure 3:
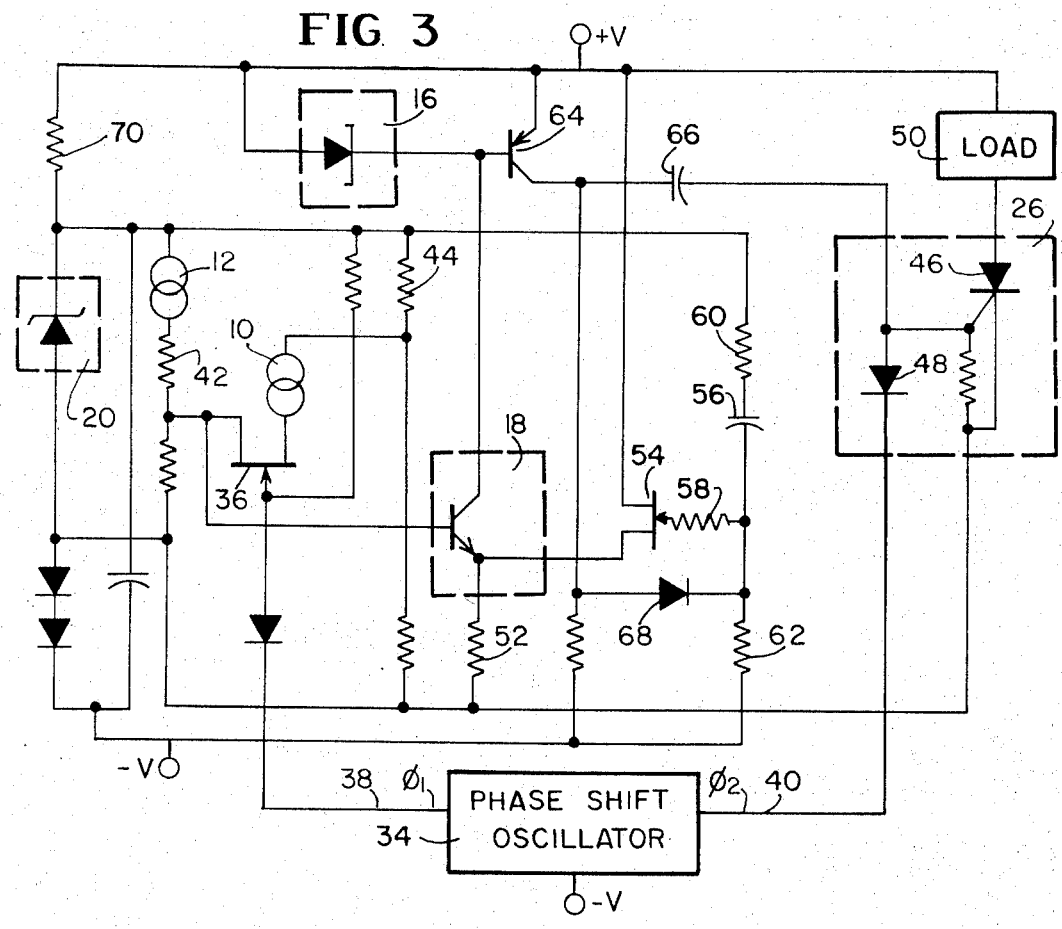
FIG. 3 is an electrical schematic of an embodiment of the invention.

Considering next the electrical schematic of FIG. 3, it will be appreciated that therein is illustrated one of many arrangements for carrying out the inventive concept.

A basic design criterion is the operating nature of the threshold device 16, i.e., voltage operated or current operated. As shown in FIG. 3 and as earlier mentioned, the preferred embodiment is a current operated threshold device, namely a tunnel diode 16. Although a tunnel diode has been recognized in the past as a threshold device, because it is highly sensitive to small input current changes to yield large output voltage changes, a tunnel diode normally is not considered as comparator, since it has relatively wide manufacturing tolerances and is subject to significant sensitivity to ambient conditions and their changes. Nevertheless, as employed in the preferred embodiment of FIG. 3, the tunnel diode provides a simple, inexpensive and fast acting element for attaining the comparator function, and providing a highly accurate voltage comparator. Although FIG. 2 shows the threshold level 16' to be constant from $t_o$ to $t_1$ and therebeyond, such is not necessary for the accurate operation of the invention, and it is likely that the tunnel diode 16 will not produce an especially constant threshold as connected in FIG. 3. Since the constant threshold period of comparison is a single, very brief commutating or switching period during which one segment of each of the two derived currents 10' and 12' are being compared against the level 16', the "constant" nature of the threshold device 16 is quite secondary to its fast response time.

A phase shift oscillator 34, preferrably having a sinusoidal output characteristic, in combination with a field effect transistor 36 define the switch 14 of FIG. 1. The oscillator provides opposite first and second phase outputs from a pair of output lines 38 and 40. When the first phase on the line 38 is negative, the f.e.t. 36 is off (source-drain is open), and the circuitry arrangement sees only the known voltage 12 as it appears across a resistor 42. When the first phase on the line 38 is positive, then the f.e.t. 36 is on and the circuitry arrangement sees approximately the average of the unknown voltage, as it appears a across a resistor 44, and the known voltage across the resistor 42. If the unknown source 10 is less than the known voltage source 12, then the average of the two will be less than the known voltage; hence, the relative magnitudes of the two sources 10 and 12 can be determined without specifically monitoring them separately, as is suggested by the diagram of FIG. 1. If, however, one were willing to pay for the added expense of circuitry for separately monitoring each voltage source, such arrangement easily could be made part of an embodiment of this invention.

By setting forth the unknown as the voltage source 10 and further by deciding that it is only of interest when that source is greater than the known source 12, the second phase of the oscillator 34 on the line 40 can be employed for controlling the coincidence detector 26. The coincidence detector 26 primarily comprises an SCR 46 and a diode 48, the latter having its cathode side connected to the second phase line 40 and its anode connected to the gate of the SCR. Connected as just described, when the second phase of the oscillator is negative on the line 40, the SCR gate is clamped to ground for preventing the firing of that element. Thus, when the known voltage is greater than the unknown and thereby the known derived current signal 12', being greater than the unknown signal 10', triggers the threshold means 16, (which is the reverse of that shown in FIG. 2 and not of significance to the specifically desired operation of the preferred embodiment in FIG. 3) there will not be developed an output from the detector 26, i.e., the SCR 46 will not conduct and a load 50 will not have an indicative voltage developed thereacross.

Now therefore, an alarm condition arises when the unknown source 10 is larger than the known source 12, the threshold device 16 will be triggered when the f.e.t. 36 is off (the phase on the line 38 then being negative) and the SCR 46 is unblocked and fires (the phase on the line 40 then being positive) to pass a signal through the load 50.

At this juncture it is important to an understanding of the embodiment of FIG. 3 to point out that the voltage to current converter 18 provides an additional operation. As shown in FIG. 3, the converter 18 is a transistor connected in the emitter follower configuration; as such it looks at the voltage across a resistor 52, which is connected at its first end to the emitter of that transistor which thereby attempts to maintain that voltage constant by drawing varying amounts of collector current. The reference voltage source 20 is provided by a zener diode which has its anode connected to the second end of the resistor 52. Connected in the just described manner, the base voltage of the transistor 18 moves relatively in the inverse direction of changes in the unknown voltage source 10. Thus, when the unknown voltage becomes larger than the known, the base voltage decreases by moving closer to ground.

Under the stated conditions and circuit connections, the operation of the threshold device 16 is implemented by: a field effect transistor 54, connected as a follower to the converter transistor 18, a capacitor 56, connected by way of limiting resistors 58 and 60, to the f.e.t. 54 and the cathode side of the zener diode 20, and a large resistor 62 connecting the capacitor to the anode side of the zener diode. The f.e.t. 54 acts as a voltage controlled current source such that as the voltage from the zener diode is a source of current stored slowly by the capacitor 56, the gate voltage of the f.e.t. 54 decreases, and, as a consequence, the transistor 18 must draw more collector current from the tunnel diode 16 to maintain the voltage across the resistor 52. By drawing more current, the transistor 18 forces the tunnel diode slowly to approach its peak point current at which any further slight increase in current will produce a large voltage change, i.e., its threshold. Accordingly, the capacitor 56 and the f.e.t. 54 form a decreasing current bias situation upon the resistor 52, thereby causing transistor 18 to increase the bias current on the threshold device 16, as discussed with respect to FIG. 1. To avoid possible confusion in the designation of elements and their functions, the "increasing" bias current block 22 is not shown in FIG. 3.

Since the base of the transistor 18 is responsive to the rapidly oscillating different voltage magnitudes from the sources 10 and 12 as they are effectively being switched by way of the f.e.t. 36, and the changing bias from the capacitor 56 and the f.e.t. 54 is driving the tunnel diode toward its threshold, it now will be apparent that the sum of those two conditions upon the transistor 18 will cause it to draw sufficient current to exceed the threshold level and generate an increased output from the tunnel diode. Such output is amplified by a transistor 64 and coupled by a capacitor 66 to the gate of the SCR 46 to cause the latter to fire, assuming the earlier discussed blocking condition does not exist.

The triggering of the tunnel diode 16 establishes a discharge path for the capacitor 56 through a diode 68, the then conducting transistor 64, a resistor 70 and back to the resistor 60. When thus discharged, the capacitor 56 removes the bias condition from the transistor 18, which in turn resets the tunnel diode to below its trigger level. A reset (not shown) is used for unlatching the SCR 46; thus, providing the reset function shown with reference to the block 32 of FIG. 1 and completing the description of the primary features of the embodiment of FIG. 3 as well as its operation.

The phase shift oscillator 34 was initially disclosed as being preferrably one which produces a sinusoidal output. With such an oscillator, the commutating switch action will cause the composite signal 24 to take the form of a sine wave, rather than the square wave form illustrated in FIG. 2, and have the advantage of increasing the accuracy of the comparator operation, since the "peak" of the sine waves defines a shorter time interval for the applied voltages than the flat top of a square wave. Also a sine wave oscillator minimizes switching transients.

In the event that voltage to current conversion is utilized, the only restriction imposed on the voltage to current converter is that it have a monotonic transfer function. Therefore, a non-ideal voltage to current converter showing various and relatively slowly varying offset and gain properties can be used.

The circuit elements illustrated in FIG. 3, but not specifically mentioned or given reference numbers, provide well known functions, such as filtering, voltage dropping, limiting, acting as loads, coincidence detection, etc.

Another possible form of the threshold means could be a gas discharge tube.

The coincidence detector could be modified to indicate which of the two sources caused triggering of the threshold. One such modification could replace the sCR with a flip-flop having the diode 48 connected to its set input, and the transistor 64 gated with the first phase line 38 and connected to the clear input.

Other modification to the embodiment of FIG. 3 may be advantageous under various circumstances, while remaining within the scope of the invention as set forth with respect to FIG. 1. Moreover, the relative terminology of "increasing" or "decreasing" the bias current depends upon the frame of reference, so that the application of the invention according to the method and the block diagram of FIG. 1 is to be given commensurate breadth.

It is to be noted that the effective d.c. gain of the subject apparatus can be made arbitrarily large by making the rate of increase of the bias on the threshold device quite small with respect to the commutating frequency of the oscillator.

What is claimed and sought to be protected by United States Letters Patent is:

1. A method for comparing the relative magnitudes of at least two signal sources, comprising the steps of: monitoring said sources with reference to their relative magnitudes in an alternating manner in relatively rapid succession; developing, as a result of said monitoring, a representative signal having alternating segments representative respectively of said relative mangitudes; generating a slowly increasing bias signal; establishing an undefined threshold level having a magnitude greater than the sum of said representative signal and an initial value of said slowly increasing bias signal; applying the sum of both said representative and bias signals to said threshold level until that level is reached at a time when a signal segment representing the signal source having the largest magnitude is being monitored; and identifying at least one of the sources when it is of the largest magnitude at the time when the threshold is reached.

2. A method according to claim 1 in which said monitoring is accomplished by actuating switching means by phase shift oscillations, such phase shift oscillations also being employed in said identifying.

3. A method according to claim 2 in which said developing of the representative signal is enhanced by employing sinusoidal phase shift oscillations.

4. A method according to claim 1 in which said generating of the bias signal is accomplished by slowly increasing the application of electric energy to a threshold level forming means.

5. A method according to claim 4 in which the energy is in the form of electric current, the threshold level means is a current operated means, and the increasing of the application of the current is accomplished by establishing a current flow of a fixed magnitude, having as one source the current through the threshold means and also another contributing source and then slowly decreasing the contribution of the other source to force an increase in current through the threshold means.

6. A method according to claim 1 in which said sources are voltage sources, further comprising the steps of converting the representative signals from voltage to current for said applying, and said generating of the bias signal generating a bias current.

7. A method according to claim 1 in which said source monitoring and said bias generating are made relative to one another by arranging the rate of the alternating of the monitoring and the rate of the increase of the bias such that, during the time of the single alternating monitoring of two of the sources, the magnitude of the bias increase is less than the difference in magnitude between the two sources.

8. A method according to claim 1 further including the step of resetting the bias signal to its initial value subsequent to the reaching of the threshold level.

9. Structure for comparing the relative magnitudes of at least two signal sources, comprising: means for monitoring said sources with reference to their relative magnitudes in an alternating manner in relatively rapid succession and for developing a representative signal having alternating segments representative respectively of the relative source magnitudes; means for generating a slowly increasing bias signal having an initial value; means for establishing an undefined threshold level having a magnitude greater than the sum of the representative signal and the initial value of the slowly increasing bias signal; means for applying the sum of both the representative signal and bias signal to said threshold level means until its threshold level is reached at a time when a signal segment representating the signal source having the largest magnitude is being monitored; and means for identifying at least one of the sources when it is of such largest magnitude at the time when the threshold is reached.

10. Structure according to claim 9 in which said monitoring means comprises switching means and a phase shift oscillator for operating said switching means.

11. Structure according to claim 10 in which said phase shift oscillator is of the sinusoidal type.

12. Structure according to claim 10 in which said oscillator is coupled to said identifying means for controlling the operation of said identifying means.

13. Structure according to claim 9 in which said threshold establishing means primarily comprises a tunnel diode.

14. Structure according to claim 9 in which said threshold establishing means comprises a current operated element.

15. Structure according to claim 14 in which at least one of the signal sources is a voltage source and there is further provided voltage to current conversion means interposed between the signal sources and said threshold establishing means.

16. Structure according to claim 14 in which said bias generating means comprises circuitry coupled to said threshold establishing means for slowly increasing the current flow therethrough, a quantum of such current flow defining a threshold level.

17. Structure according to claim 16 in which said circuitry comprises means for developing a relatively constant voltage requiring a relatively constant quantity of applied current, first and second current flow paths for providing such quantity of current, one of said paths being through said threshold establishing means and the other of said paths being provided with means for slowly decreasing the current flow therethrough.

18. Structure according to claim 9 which further comprises reset means responsive to the threshold level being reached for resetting said bias generating means for commencing its generating from the initial value.

19. Structure according to claim 18 in which said reset means includes part of said bias generating means.

* * * * *